(12) United States Patent
Weston

(10) Patent No.: US 10,093,399 B1
(45) Date of Patent: Oct. 9, 2018

(54) LIFE REFLECTOR

(71) Applicant: Charles R. Weston, Iowa, LA (US)

(72) Inventor: Charles R. Weston, Iowa, LA (US)

( * ) Notice: Subject to any disclaimer, the term of this patent is extended or adjusted under 35 U.S.C. 154(b) by 0 days.

(21) Appl. No.: 15/907,751

(22) Filed: Feb. 28, 2018

Related U.S. Application Data

(60) Provisional application No. 62/625,574, filed on Feb. 2, 2018.

(51) Int. Cl.
| | | |
|---|---|---|
| *B63B 45/04* | (2006.01) | |
| *G08B 5/00* | (2006.01) | |
| *F21S 41/37* | (2018.01) | |
| *G09F 13/20* | (2006.01) | |
| *F21S 41/30* | (2018.01) | |
| *G09F 13/00* | (2006.01) | |
| *C09D 5/33* | (2006.01) | |

(52) U.S. Cl.
CPC .............. *B63B 45/04* (2013.01); *F21S 41/37* (2018.01); *G08B 5/002* (2013.01); *G09F 13/20* (2013.01); *B63B 2201/12* (2013.01); *B63B 2201/26* (2013.01); *C09D 5/004* (2013.01); *F21S 41/30* (2018.01); *G09F 13/00* (2013.01)

(58) Field of Classification Search
CPC ........... B63B 45/04; F21S 41/30; F21S 41/37; G09F 13/00; G09F 13/20; C09D 5/004
See application file for complete search history.

(56) References Cited

U.S. PATENT DOCUMENTS

| | | |
|---|---|---|
| 3,122,736 A | 2/1964 | Weber |
| 3,520,273 A | 7/1970 | Daifotes |
| 4,962,720 A | 10/1990 | Leffel |
| 5,398,026 A | 3/1995 | Handsaker |
| 6,250,248 B1 | 6/2001 | Patera |
| 6,481,366 B1 | 11/2002 | Patera |
| 9,096,297 B2 * | 8/2015 | O'Maley ................. B63B 45/04 |
| 2013/0203310 A1 * | 8/2013 | Newman ................... B63C 9/13 |
| | | 441/92 |

OTHER PUBLICATIONS

Sound Specialty Coatings Corporation; Email and Aquaply M product information; retrieved from http://sscoatings.net/aquaplym-info.htm on Feb. 27, 2018; 4 pages; Bruton, WA US.

* cited by examiner

*Primary Examiner* — Benyam Haile
(74) *Attorney, Agent, or Firm* — Tom F. Pruitt

(57) ABSTRACT

The practice of this invention enables saving a life. A passive distress alert for distressed vessel in water is provided. The self-activating alert is positioned on or near hull bottom zone and distress message is at least partially presented, without human or mechanical, electronic or other trigger, when vessel is keel over or in other overturned positioned and can indicate relative percent keel over. The alert reflects natural and artificial light and/or has components which are fluorescent, with or without special black light, either at day or night to present a distress message to a detector. Detector can be an aided or unaided human eye, camera, bar code reader, or other alphabetic or numerical character or symbol electronic recognition device. Distress message can be SOS, MOB, HELP, CQD, R&R, MAYDAY and other local or universal distress messages or combinations thereof or special distress alert comprising bars, dots, dashes and other symbols. A vessel comprising a passive distress alert is disclosed.

18 Claims, 3 Drawing Sheets

LIFE REFLECTOR

CROSS-REFERENCE TO RELATED APPLICATION

This application claims the benefit of U.S. Provisional Application No. 62/625,574, filed Feb. 2, 2018.

DESCRIPTION

FIELD OF THE INVENTION

The invention relates to passive distress alerts for distressed vessels in water and vessels comprising such alerts. The invention relates to a distress alert that is self-activating, being positioned on or near hull bottom zone and at least partially given when vessel is keel over or in other overturned positioned. The invention further relates to use of distress messages that reflect natural and artificial light and/or are fluorescent and are detectible by human or machine.

DETAILED DESCRIPTION

Background of the Invention

There is a need to quickly find overturned vessel to rescue stranded persons who might cling or remain near to their vessel in hazardous conditions or perish if not found quickly. Whilst large commercial vessels have sophisticated electronic communication systems to issue vessel distress messages and issue global positioning signals ("GPS") signals to pinpoint locations of such vessels when in need of aid, small water craft often do not such capabilities, whether personal or commercial.

Searches are often hampered, during daytime and especially at night or with overcast weather conditions. Nature's camouflage is a significant problem along rivers, in local lakes, bayous, swamp grass laden ponds, or wooded arenas, such as by tree canopies and other over growth. On open seas or along coasts, at long distances, keel over vessel outlines merge with water, especially with wave action or with shore backgrounds.

U.S. Pat. No. 6,481,366 to Patera deploys a "SOS" flag when a personal watercraft overturns. Such flag is not readable by aerial search to be a distress message and has limited visibility by search planes. It is not visible at night or with overcast weather conditions. It not self-activating, instead requiring activation by the craft. The mechanical apparatus is subject to failure by corrosion or other fouling. U.S. Pat. No. 6,250,248B1 also to Patera displays a caution flag, in particular at his FIG. 4, which is not readily readable by aerial search to be a distress message nor effectively detected at night.

U.S. Pat. No. 5,398,026 to Handsaker shows a light or distress signaling transmitter which is electrically activated, requiring a power source and is thus not passive.

U.S. Pat. No. 4,962,720 to Leffel is for a self-storing flag assembly for mounting to a boat, which is not effective readable by aerial search to be a distress message or detectable at night.

U.S. Pat. No. 3,520,273 to Daifotes shows a flare device mounted to a bumper of a car, and with relatively short flare life, is not adaptable to extended detection over long hours.

U.S. Pat. No. 3,122,736 to Weber shows a safety signaling device for a swimmer, not easily adaptable to be effective for an overturned watercraft.

Above and other traditional approaches leave a significant void, resulting in extended, lengthy, very costly search and rescue missions, and in some instances, loss of life. In each, only a relatively small target alert is available for detection, often obscured by natural surroundings Heretofore, there has been no prior art need for capability for reflection of light or fluorescence on vessel hulls near or below the water line or use thereof for rescue and life saving. That is, without need for reflecting or fluorescent materials below the water line, there is a gap, a void in the prior art regarding use of reflective or fluorescent materials below the water line on vessel hulls.

BRIEF SUMMARY OF THE INVENTION

The practice of this invention enables saving a life.

This invention does that which no one has done before; to wit, place a reflective or fluorescent distress message on a vessel hull, preferably below the water line, more preferably at or near the hull bottom.

This invention is low cost, simple to maintain. This invention does not require a human trigger or mechanical, electrical, pressure or other sensor or operator to trigger a distress alert, which alert is instead retained passively in reserve while vessel is in normal operation but is automatically presented upon vessel keel over.

I have discovered that when a vessel overturns, such hull material comprising a distress alert is made to appear above waterline, which then can reflect and/or fluoresce to display a distress message. The distress alert as claimed can be easily detected, from a distance, either at ground levels or from the air, and pinpoint location of the distressed vessel.

The invention provided is suitable for any vessel. As used in the Specifications and Claims, "vessel" means any vessel that can float, before keel over, on water, including but not limited to those selected from the group consisting pirogue, canoe, dinghie, raft, peddle boat, surf board, small water craft, ship, pontoon floated watercraft or aircraft (whether fixed wing or helicopter type), whether propelled by human motive force, or engine, water or air jet thrust, propeller or other mechanical power or sail or whether business, luxury, cruise or pleasure.

I have found an effective distress alert for distressed vessel in water which alert is (a) positioned on hull of the vessel, (b) reflects natural and artificial light or is fluorescent either at day or night, (c) passively, automatically presents distress message to adetector and (d) at least partially visible to detector when vessel is keel over.

As used in the Specifications and Claims, "keel over" for a vessel means to roll so far on its side that it cannot recover or to have a greater roll over. Keel over includes, but is not limited to, capsize or turn turtle where, through about a 180° roll or greater, much of a vessel's hull is above its deck or other superstructure.

I have discovered that a distress alert preferably positioned for maximum coverage of vessel hull, with such alert more preferably positioned to take up most of the bottom portion of said vessel hull below the waterline. When possible, it is preferred to make the distress alert bigger, by maximizing its size as a percentage of vessel hull; however alert is to be sized for the particular size vessel to which it is applied. In one variation, the distress alert is positioned below normal below water line when not keel over and no portion thereof is visible. In a preferred variation, coverage over around seventy (70%) of the hull by the distress alert is effective. The distress alert can be positioned to indicate percentage (%) of capsize when keel over. In other variations, a portion of the distress alert may appear above waterline during normal vessel operation, where distress condition becomes apparent with relative progress toward keel over. Thus, the alert may be (a) partially up above waterline and below waterline, (b) solely below water line, or (c) on selected bottom zone, such as either or both ends as if an iceberg tip if vessel sinks with only one end visible.

I have discovered less complex methods and apparatus for giving a vessel-in-distress alert. A distress message is passive, then presented at keel over by the distress alert for detection by a detector. In variations of this invention, the distress message is selected from the group consisting of one or more SOS, MOB, HELP, CQD, R&R, MAYDAY and other local or universal distress messages. In other variation, the distress message is (a) alphabetic (for illustration SOS or others above) or numeric characters (for illustration 911, 112, 108 or others) or (b) symbols for illustration (...---... ...---...) three-dots/three-dashes/three-dots for SOS or others, or (c) combinations of elongated bars and/or dots and/or ovals or other shapes to facilitate detection from multiple directions and angles or perspectives of view. In addition, the distress alert may comprise and/or display local, international or universal vessel identification.

I have developed, in one embodiment of this invention, a means of coding one or more of SOS, MOB, HELP, CQD, R&R, MAYDAY and/or other local or universal distress messages by converting to visible, not sound, codes such bar and/or dot and/or dash codes to enable long range human visual or machine detection. I developed combinations of elongated bars, dots, o ovals and other shapes to facilitate detection of a distress message from multiple directions and angles or perspectives of view.

In variations of this invention, the detector can any one or combination of one or more of the following (a) human eye, (b) alphabetic and/or numeric and/or symbol recognition device, for illustration, a car license plate reader (c) camera, whether single photo or video or other (d) bar code reader and/or (e) color sensing or recognition, whether by natural and/or artificial light, and/or visible light or infrared or black light. In preferred variations, the distress alert at keel over is detectable, at day, or night upon presence light where it either or both (a) reflects or (b) is fluorescent, with or without special black light.

In preferred embodiments, the distress alert is passive, wherein passive means not requiring any human, electronic, chemical or physical activation except vessel keel and said alert is preferably presented or automatically visible upon keel over or other overturn. For illustration, self-activating means alert is presented without electrical or chemical trigger source (for illustration, not driven by pressure source or batteries, solar panels or other electrical source or by spring or other mechanical trigger source or by chemical reactor or burning such as a flare).

In variations of this invention, if subject vessel is out of the water such as in transit, for illustration, being conveyed upside down on car rooftop or upside down on trailer, then it preferred that the distress alert is covered. If the subject vessel is in the air, such as pontoons of float plans or helicopters, or others, then it is understood that distress alert is not from water position.

DETAILED DESCRIPTION OF THE INVENTION

Figure 1:
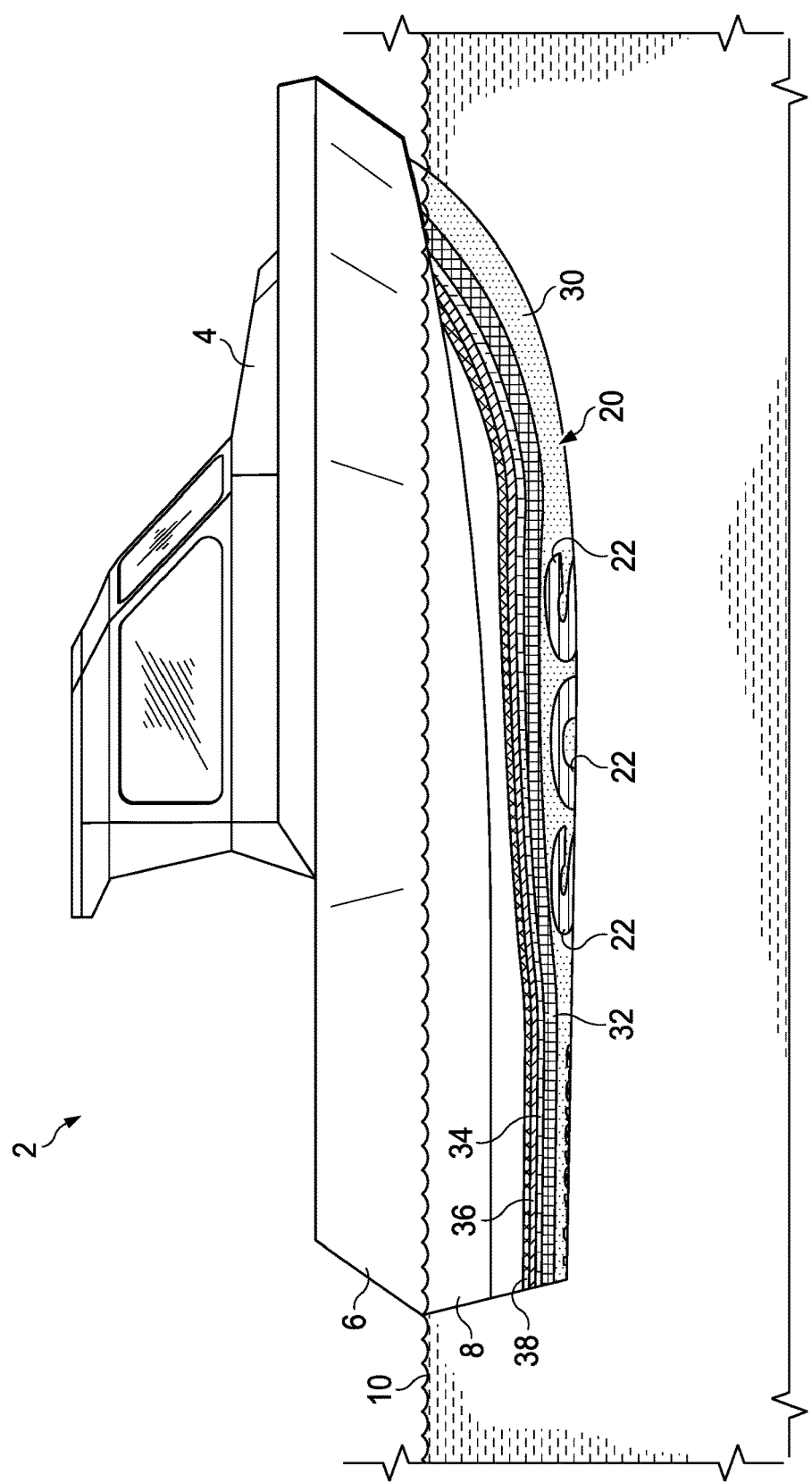
FIG. 1 is a schematic representation of a side view (not keel over) of a partial v-hull commercial fishing vessel with SOS distress alert substantially below water line during normal operation.

In one embodiment of this invention, a distress alert for distressed vessel in water which is provided. In one variation, the alert (a) is positioned on hull, (b) reflects natural and artificial light or is fluorescent either at day or night, (c) passively, automatically presents distress message to detector, and (d) is at least partially visible to detector when vessel is keel over. In another variation, the distress alert is applied, affixed or painted on selected zone of hull (a) partially up above waterline and below waterline, (b) solely below water line, or (c) either or both ends of vessel as if an iceberg tip presented for detection wherein vessel partially sinks with only one end visible. Preferably, the distress notice portion of the distress alert is below normal below water line when not keel over. In preferred embodiments, the distress alert pattern is positioned for maximum coverage of the hull to take up most of the bottom of said vessel, preferably over around seventy percent (70%) of the hull in the water. In the above context, the term "passive" or "automatic" means not requiring any human, electronic, chemical or physical activation to be presented for detection except vessel keel over and said alert is preferably presented or visible upon keel over or other overturn without activation.

Any distress message of reasonable length that can be fitted on a hull can be selected, or which can be fitted, in case of a surf board, raft or aircraft, fat least one portion which is visible when overturned. Preferred distress messages are selected from the group consisting of one or more SOS, MOB, HELP, CQD, R&R, MAYDAY and other local or universal distress messages, in any form of alphabetic or numeric characters or symbols facilitate human visual or machine detection from multiple directions and angles or perspectives of view.

Distress alerts of this invention can be detected, after enablement by natural or artificial light, with range of visible light or infrared light or black light, by (a) human eye, (b) camera, (c) bar code reader, or (d) other recognition device, which recognizes alphabetic, numeric, color or symbol displays, or combinations thereof. Preferably, the alert can be detected at day or night, upon presence of light which either or both (a) reflects or (b) causes fluorescence, with or without special black light.

In preferred embodiments, the distress alert comprises a coating or formation material having an enhancer selected from the group consisting of glitter, glass fragments, crushed mirror particles, reflective metal fragments, and/or nanoparticles, at day or night, upon presence light either or both (a) reflects or (b) is fluorescent, with or without special black light or aids in reflection or fluorescence.

The commercially available paints are suitable for use on hulls of vessels for in-water service and retain ability to reflect distress alert including Aquaply M for a base paint and Aquaply M-LR which is light reflective, available from Sscoatings, Seattle, Wash.

The commercially available paints are suitable for use on hulls of vessels for in-water service and retain ability to fluoresce distress alert Aquaply M for a base paint and Aquaply M-LMW glow-in-dark for ability to be fluorescent, both available from available from Sscoatings, Seattle, Wash.

Other commercially available marine paints which are reflective and/or fluorescent are known in the art but have not been used in the prior art below the water line on hull bottoms, for their reflective and/or fluorescent capabilities.

FIG. 1 shows normal operation side view of a partial v-hull commercial fishing vessel 2, without keel over. Vessel 2 has superstructure 4 and out of water deck area 6, and bellow water portion of hull 8. The distress alert 20, 22 and 30 through 38, inclusive, is not visible during normal operation, because such are substantially below water line 10.

Figure 2:
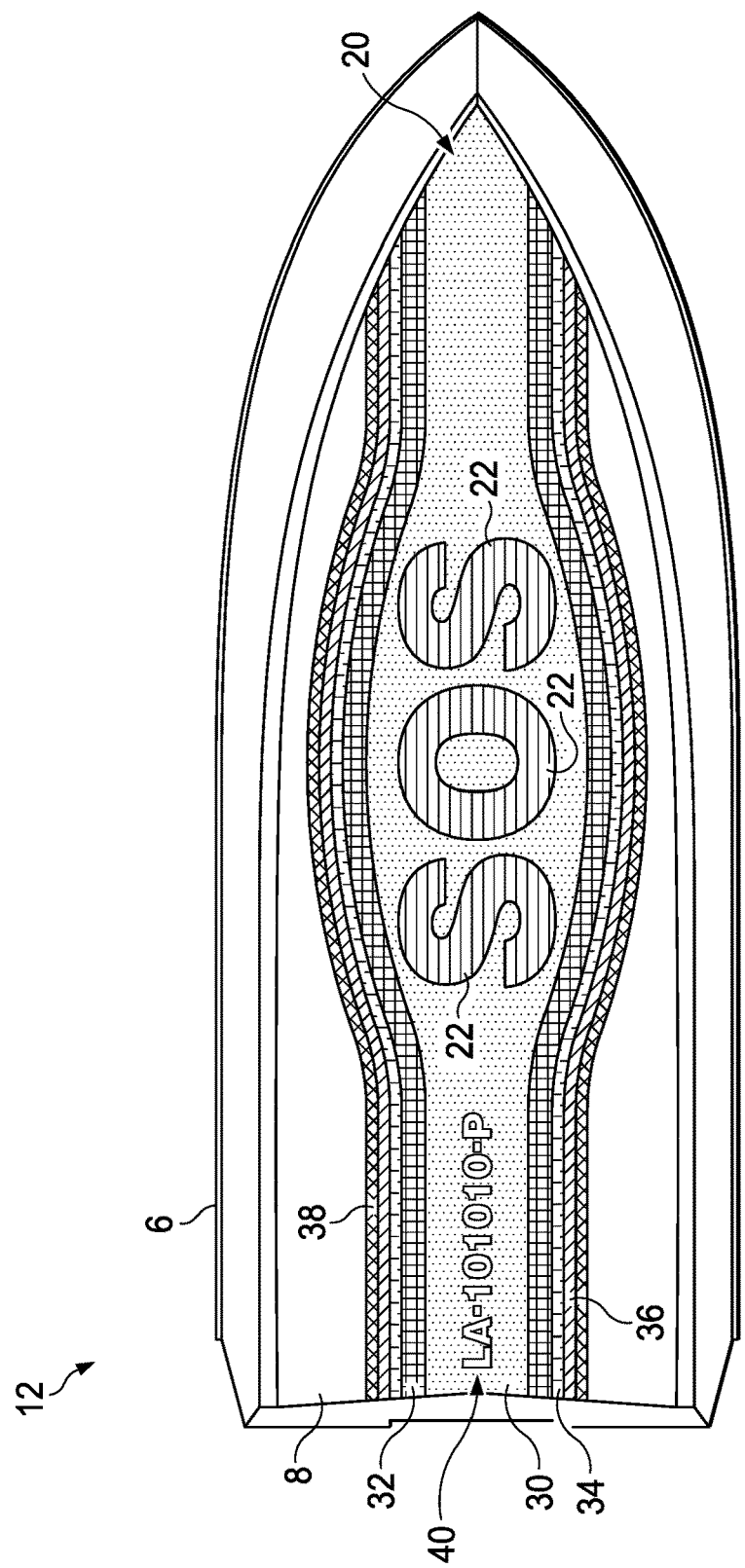
FIG. 2 is a schematic drawing of keel over partial v-hull commercial fishing vessel presenting a passive distress alert, in this illustration instance SOS, in accordance with this invention.

FIG. 2 shows keel over view 12 of the partial v-hull commercial fishing vessel 2 of FIG. 1. The passive distress alert 20, in this illustration instance the bright color red, optionally with SOS 22 is presented for detection as main distress alert at or near bottom hull 8, focused at center, yet extending at a selected width from front of vessel to rear. In accordance with this embodiment of this invention, distress alert is base alert color 30 such as a bright red and comprises distress message SOS 22 in large size and/or in differing color 22 and vessel identification in optionally in different color 40, respectively. To indicate relative percentage or amount of capsize, multiple other scaled zones, of varying numbers and width, selected to fit the size of the hull, are presented for detection in different colors, for illustration as shown 30, 32, 34, 36, and 38. In one variation such are of a fluorescent material, detectible with or without use of black light. In one variation, color 22 is yellow reflecting or fluorescent lettering in red 30 reflecting or fluorescent background. Variations of this invention allow for different sizes, shapes, width, wavy or straight patterns of said multiple scaled zones, following hull contours, extensions and contractions, for various hull configurations for differing types of vessels. Preferably such scaled zones extend end-to-end on vessel hull. Variations of this invention allow for different sizes, shapes, width, wavy or straight patterns of said multiple scaled zones, following hull contours, extensions and contractions, for various hull configurations for differing types of vessels. Base alert color is preferably a bright shinny color (such as red, orange, yellow or other selection) reflector, such as one comprising basic reflecting or fluorescent paint and optionally a reflection or fluorescence enhancer such as glitter, crushed mirror, crushed or other enhancers or is a fluorescent material, detectible with our without use of black light. In one variation, color 22 is yellow reflecting or fluorescent lettering in red 30 reflecting or fluorescent background. Consumers, for illustration for their personal craft, and others may elect to select random colors or assume risk to apply only one or more specific colors, including muted, clear, gray and/or camo.

Figure 3:
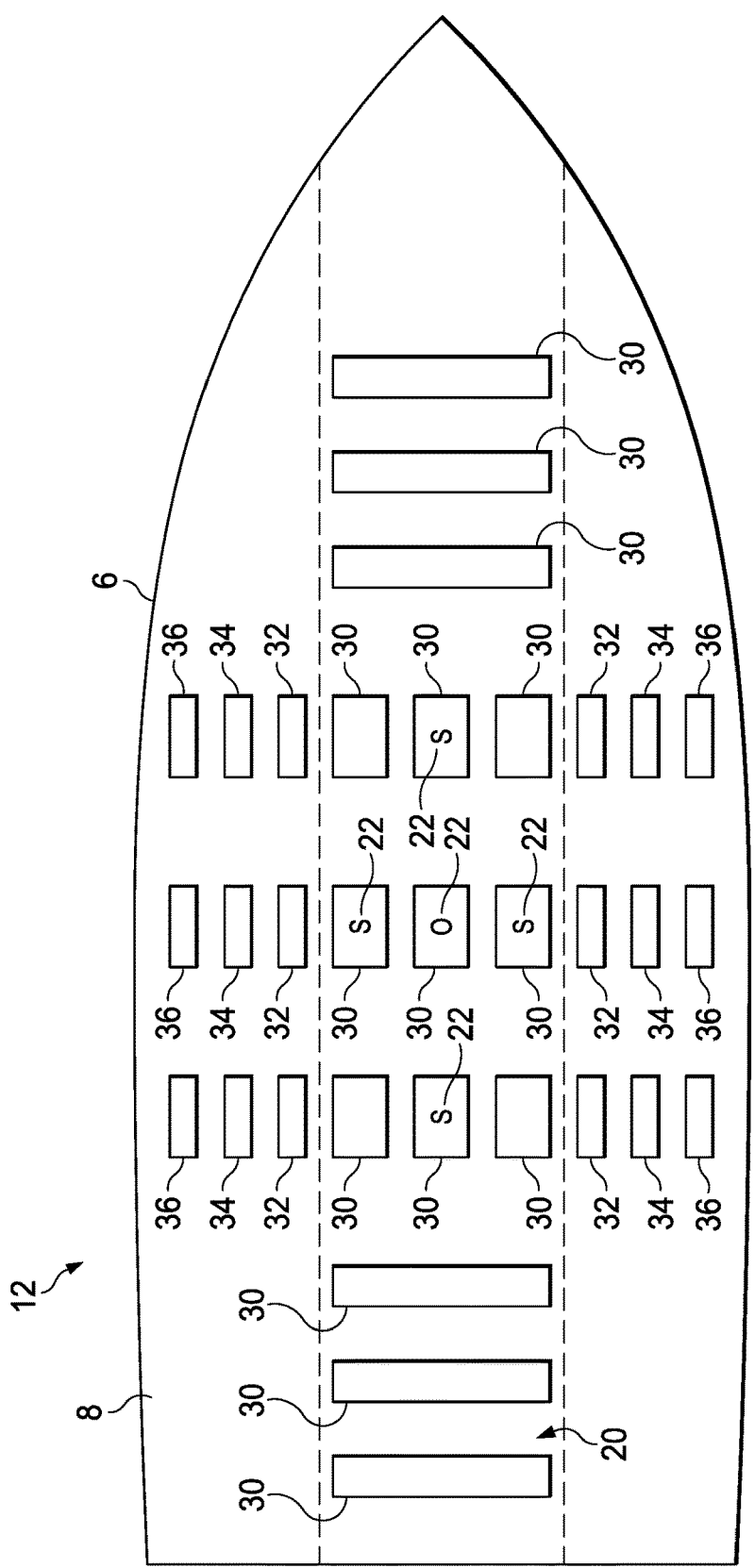
FIG. 3 is a schematic drawing of keel over flat bottom personal boat presenting distress message in bar coded format in accordance with this invention, with this variation presenting, in this illustration instance, narrow bars for 'short dots' equivalents and wider bars for 'long dashes' equivalents.

FIG. 3 is a schematic drawing of keel over view 12 flat bottom personal boat presenting on variation of a distress message in bar coded format in accordance with this invention. In the one embodiment of this invention shown in FIG. 3, SOS 22 distress message appears on or as part of reflective color 30 in this FIG. 3 is selected from SOS, MOB, HELP, CQD, R&R, MAYDAY and/or other local or universal distress messages and converted to a bar code. This variation of FIG. 3 presenting, in this illustration instance, narrow bars for 'short dots' equivalents and wider bars for 'long dashes' equivalents. In the variation shown, "...---..." SOS 22 distress message is presented in very large formation for detection from a distance by symbols of 3 narrow bars, 3 wide bars, 3 narrow bars as symbols for (...---... ...---...) three-dots/three-dashes/three-dots for SOS. SOS 22 distress message also appears in alphabetic characters "SOS", viewable from multiple directions. From FIG. 3 it is apparent that many variations are within the scope of this invention and such may comprise variation combinations of elongated bars and/or dots and/or other graphical shapes to facilitate detection from multiple directions and angles or perspectives of view. Side bars 32, 34, and 36 can be in differing colors to indicate percentage of capsize, or in case of flat bottom whether 100% capsized showing all of 32, 34 and 36 or leaning on side when only one set of, or parts of, 32, 34 and/or 36 are detected.

The distress alert can be "painted on" using a hull paint which is reflecting or fluorescent for marine in-water use yet elastomers, plastics, asphalts or ceramics, whether removable or replaceable, and the like are within scope of this invention. Optionally said distress alert comprises a reflection or fluorescence enhancer such as glitter, crushed mirror, crushed glass or other enhancers or is a fluorescent material, detectible with or without use of black light.

In one variation, the distress alert comprises a nanohybrid composite of reflective nanoparticles which have been combined with paints and/or layers or crushed particles of plates of glass or ceramic or fibers of elastomers, plastics, or asphalts. The term " nanohybrid composite" as used the Specification and Claims to mean combination of different materials, the properties of which combination differ from those of its components to enable contradictory properties.

Light reflection off cold boat hull will be adversely impacted. Problem with reflective or fluorescent material on bottom of vessel is that the material will be cooled by natural cooling of water on the hull, which in very cold climates amplifies cooling effects.

Nanomaterial-containing coatings can provide better properties than conventional coating. It is known in that art that, due to small particle size of 100 nm or less, some nanomaterials are suitable for use in transparent coating systems. It is also known in the art that solar reflectance varies with sample color where 'cool yellow" is about 160% higher than standard yellow.

Coatings formulated with special pigments that are able to reflect light and radiation in visible, near-infrared, NIR, spectrum are known in the art. Also, reflective paint containing nanoparticles is known in the art. Study of reflectivity of paints containing infrared-reflective pigments has been made which indicate plates coated with paints containing IR-reflecting pigments displayed lower air temperature on the opposite side as compared to conventional coatings, indicating that they can be effective to reflect NIR.

Nanoparticles change properties of paints and other coatings due to their specific structural characteristics such as size, shape and greater surface area. In one study, a nanoparticles layer of bright nickel base was deposited on copper substrates using electrodeposition technique before spraying with paint. IR reflectance of the paint was found to be around 0.4 without bright nickel layer and the reflectance increased to 0.6 at a Ni layer thickness of 750 nm.

Sensitivity exists however about use of certain nanoparticles, which might be beneficial reflection or fluorescence enhancers, in view of potential adverse environmental impacts. Thus, in one variation of this invention, reflective or fluorescent nanoparticles are admixed or blended with glass and/or plastics and then formed into solids which are crushed to form smaller segments which can be combined into paints or other coatings. Such solid encasement prevents leakage of the nanoparticles to the environment and avoids resulting harms.

Although the various embodiments of the invention have been described, it is to be understood that they are meant to be illustrative only and not limiting. It is apparent that the present invention has broad application to passive distress alerts for keel over vessels. Certain features may be changed without departing from the spirit or scope of the present invention. Accordingly, the invention is not to be construed as limited to the specific embodiments or examples discussed but only as defined in the appended claims or substantial equivalents of the claims.

The invention claimed is:

1. A method of providing a distress alert for distressed vessel in water comprising:
    positioning a distress message on hull of the vessel;
    wherein the message is positioned below the normal water line when not keel over;
    wherein the message is displayed by a highly reflective or fluorescent material;
    wherein the message comprises one or more universal distress messages; and
    wherein the message is at least partially visible when vessel is keel over.

2. The method of providing a distress alert in accordance with claim 1; wherein said vessel is any vessel that can float, before keel over, on water, whether propelled by human motive force, or engine, water or air jet thrust, propeller or other mechanical power or sail.

3. The method of providing a distress alert in accordance with claim 1; wherein the distress message is selected from the group consisting of one or more SOS, MOB, HELP, CQD, R&R, MAYDAY.

4. The method of providing a distress alert in accordance with claim 1; wherein the message covers over 70% of the hull.

5. The method of providing a distress alert in accordance with claim 1; wherein the message is passive.

6. The method of providing a distress alert in accordance with claim 1; further comprising a detector which is enabled by natural or artificial light, with range of visible light or infrared light or black light; wherein the detector is machine recognition.

7. The method of providing a distress alert in accordance with claim 1; wherein the message is applied on selected zone of hull on either or both ends of vessel's keel.

8. The method of providing a distress alert in accordance with claim 1; wherein the message is visible with or without black light.

9. The method of providing a distress alert in accordance with claim 1; wherein the material comprises a coating having an enhancer selected from the group consisting of glitter, glass fragments, crushed mirror particles, reflective metal fragments, and nanoparticles.

10. The method of providing distress alert in accordance with claim 1; the material comprising an enhancer component of nanohybrid composite.

11. The method of providing a distress alert in accordance with claim 1; wherein the message further displays local, international or universal vessel identification.

12. The method of providing a distress alert in accordance with claim 1; which is sized in a manner to indicate percentage of capsize when keel over.

13. A vessel comprising a hull and with a passive distress message for a distressed vessel in water comprising:
    the distress message positioned on said hull;
    wherein the message is positioned below the normal water line when not keel over;
    wherein the message is displayed by a highly reflective or fluorescent material;
    wherein the message comprises one or more universal distress messages; and
    wherein the message is at least partially visible when vessel is keel over.

14. The vessel in accordance with claim 13; wherein said vessel is any vessel that can float, before keel over, on water, whether propelled by human motive force, or engine, water or air jet thrust, propeller or other mechanical power or sail.

15. The vessel in accordance with claim 13; wherein the distress message is below normal below water line when not keel over, and covers over 70% of the hull and is selected from the group consisting of SOS, MOB, HELP, CQD, R&R, MAYDAY or other local or universal distress messages.

16. The vessel in accordance with claim 13; wherein the message is visible with or without black light.

17. The vessel in accordance with claim 13; wherein said material comprises a coating having an enhancer selected from the group consisting of glitter, glass fragments, crushed mirror particles, reflective metal fragments, and nanoparticles.

18. The vessel in accordance with claim 13; wherein distress message is passive; further comprising a detector which is enabled by natural or artificial light, with range of visible light or infrared light or black light; wherein the detector is machine recognition.

* * * * *